United States Patent [19]

Lindstrom

[11] 4,078,120

[45] Mar. 7, 1978

[54] STABILIZED IRON ELECTRODES

[76] Inventor: Olle Birger Lindstrom, Lorensviksv. 14, 183 63 Taby, Sweden

[21] Appl. No.: 685,648

[22] Filed: May 12, 1976

[30] Foreign Application Priority Data

May 12, 1975 Sweden .................................7505446

[51] Int. Cl.$^2$ ............................................. H01M 4/00
[52] U.S. Cl. ........................................ 429/27; 429/221
[58] Field of Search ........................... 429/221, 27-29, 429/107; 252/513, 519; 106/304

[56] References Cited

U.S. PATENT DOCUMENTS

| 896,240 | 8/1908 | Phillips | 252/513 |
| 959,068 | 5/1910 | Phillips | 252/513 |
| 3,819,413 | 6/1974 | Nippe et al. | 429/221 X |
| 3,920,477 | 11/1975 | Alaburda | 429/221 X |
| 3,925,100 | 12/1975 | Buzzelli | 429/221 X |

Primary Examiner—Charles F. LeFevour
Attorney, Agent, or Firm—Burns, Doane, Swecker & Mathis

[57] ABSTRACT

Iron electrodes for use in chemoelectric cells are stabilized to provide an ideal discharge curve by adding a small (e.g., at least about 0.05% and preferably from 0.5 to 1% by weight of the iron) amount of lead sulfide.

9 Claims, 2 Drawing Figures

STABILIZED IRON ELECTRODES

BACKGROUND AND OBJECTS OF THE INVENTION

The present invention relates to an iron electrode for chemoelectric cells which electrode has been stabilized by the addition of a small amount of a lead sulfide. The invention also relates to chemoelectric cells containing the stabilized iron electrode.

The iron electrode is beginning a renaissance for use as negative electrode material for alkaline accumulators. It has been shown that the iron electrode is a useful anode for use in metal-air batteries. Iron has shown a number of advantageous qualities including low price, its nonpoisonous character compared to cadmium and also a potentially high capacity density. Iron, however, also exhibits several disadvantageous properties, for instance, self discharge and poor capacity data at low temperatures.

Iron exhibits, contrary to cadmium and zinc, which are also used as anode metals in chemoelectric cells, two discharge steps, namely a first step from the valance 0 (Fe) to the valance 2 $Fe^{++}$) and a second step from the valance 2 ($Fe^{++}$) to the valance 3 ($Fe^{+++}$). The first discharge step is generally the only step utilized whereas the second discharge step may serve as spare capacity. The ideal discharge curve for an iron electrode in general exhibits the appearance shown in FIG. 1 which is a plot of the electrode potential of an iron anode versus a mercury oxide reference electrode. However, the discharge pattern may sometimes be disturbed which produces a lower capacity during the first discharge step and a larger capacity in the second discharge step than normal. This is shown, in principle, in FIG. 2. It is not established what causes this redistribution of the discharge pattern. One possible explanation is that the structure of the porous iron electrode material is disturbed or "partially limited". That is, during the first discharge step (from 0 valence to plus 2 valence), the porosity of the electrode is reduced since the reaction product $Fe(OH)_2$ take up a larger volume than the reacted iron metal (Fe). With a partially limited electrode structure, the pores for mass transfer of ions and electrolyte may be plugged up for instance at the surface of the electrode layer. During the second discharge step (from plus 2 valence to plus 3 valence), the volume of the solid electrode materials is reduced (since $Fe(OH)_3$ has a lower volume than $Fe(OH)_2$) which opens up the structure. Discharge to the second step again opens up the structure which makes the inner part of the electrode available again for the electrochemical reaction. This allows discharge at a lower potential than with the normal discharge pattern. This phenomenum which gives the user an impression of a certain capriocity of the iron electrode is an important drawback to its practical use in a battery. One tries in general to reduce the effects of this phenomenum by a slow charge followed by a deep discharge so as to restructure the electrode. The purpose of the present invention is to eliminate the disturbances in the discharge pattern to provide the ideal discharge mode for iron electrodes.

It is known since the beginning of akaline accumulator technology that addition of sulfide as iron sulfide and in quantities of above 0.2 to 0.3% by weight, in general much more (e.g., 4 or 5%), exhibits a useful effect on the capacity density and reduces the self discharge of the iron electrode. The addition of iron sulfide, the addition of a sulfide to the electrolyte or the addition of sulphur compounds to the electrode material is described for instance, in Swedish Pat. No. 196,168 and in the German Offenlegungsschrift No. 2,206,828.

Addition of these sulfide and sulfur compounds and in these quantities has, however, not been found to eliminate the variability effect of the iron electrode discharge from the ideal described above.

It is also known that addition of lead sulfide to zinc electrodes improves the charge efficiency of the zinc electrodes due to the influence of the lead sulfide on the hydrogen overvoltage. However, the lead sulfide addition could possibly not influence the discharge mode of the zinc electrode since zinc has only one discharge step. Furthermore, the lead sulfide could not have an influence on the electrode structure or porosity since the zinc electrode goes at least partially into solution during discharge as zincate and the structure is at least partially rebuilt during each charge and discharge cycle. Lead sulfide therefore exhibits a quite different technical effect when it is used as addition to the zinc electrode. The addition of lead sulfide to iron electrodes has not been suggested or tried before because iron sulfide exhibits about the same useful effect on the hydrogen overvoltage as such and it has therefore not been of any interest to add lead sulfide for this purpose.

It is an object of this invention to provide an iron electrode which substantially alleviates the problems of the prior art.

It is also an object of this invention to provide an iron electrode for use in a chemoelectric cell which shows a substantially uniform discharge pattern.

It is further an object of this invention to provide an improved chemoelectric cell containing an iron electrode which shows a substantially uniform discharge pattern.

SUMMARY OF THE INVENTION

In accordance with the present invention, there is provided an iron electrode for use in a chemoelectric cell comprising iron and a small, effective amount of a lead sulfide. The lead sulfide may be present in an amount of at least about 0.05, preferably from about 0.5 to 1,% by weight of the electrode. The lead sulfide may be added to the iron electrode in the form of small particles of less than 100 micron particle size, i.e., from 0.1 to 10, preferably from 1 to 5, microns.

DETAILED DESCRIPTION OF THE INVENTION

Figure 1:
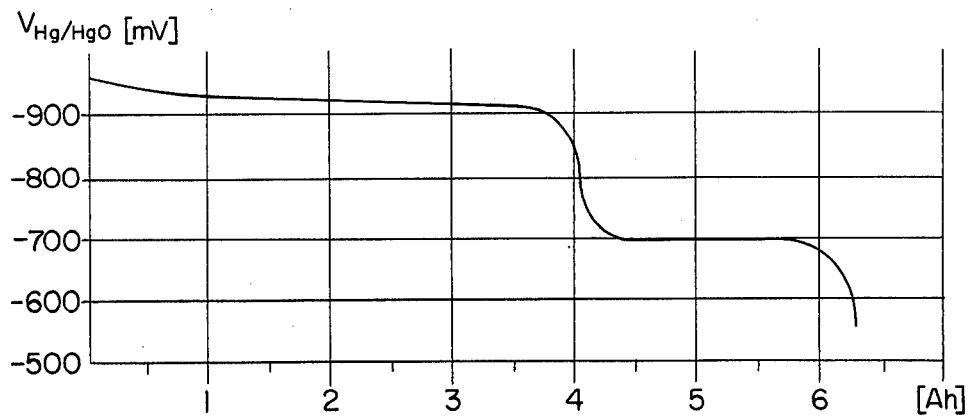
FIG. 1 is a representation of the ideal discharge pattern for an iron electrode versus a standard reference electrode.
Figure 2:
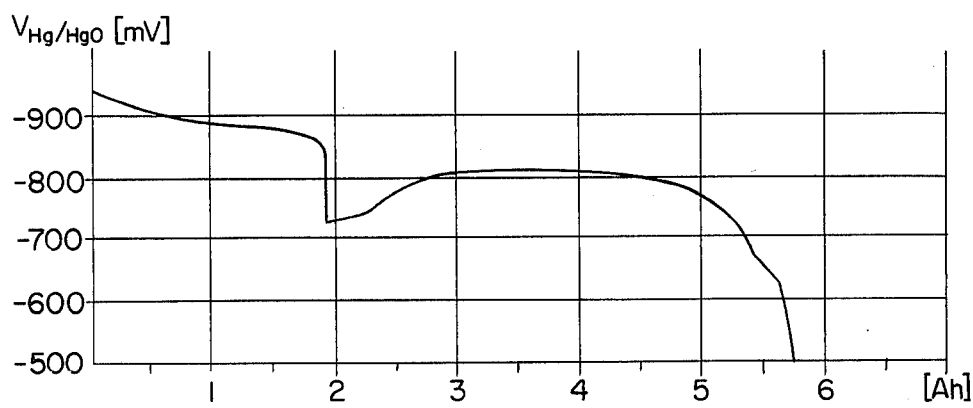
FIG. 2 is a representation of a non-ideal discharge pattern for an iron electrode versus a standard reference electrode.

The addition of lead sulfide according to the present invention has been found to stabilize the discharge pattern of an iron electrode at the ideal as shown in FIG. 1 even at very low concentrations namely, at a concentration at least about 0.05 percent by weight, preferably at least about 0.1 percent by weight based on the weight of the active iron material. The lead sulfide may preferably be present in an amount of from about 0.1 to 1 percent by weight of the active iron material. The lead sulfide may be present in amounts greater than 1 percent by weight although there is no further significant improvement in results which justify the weight increase with such larger quantities of lead sulfide.

Since the lead sulfide exerts a special discharge-stabilizing effect, it may also be useful to add iron sulfide and/or other known stabilizing additives (e.g., iron oxide) known in the art to the iron electrode. However, it has frequently been found that the addition of 0.5 to 1.0% by weight of lead sulfide to the electrode is sufficient to give the characteristic stabilizing effect of the present invention on the discharge curves together with the effects of the hydrogen over-voltage and the charging efficiency as are known to occur with the addition of other sulfides to iron electrodes.

There are many different types of iron electrodes, for instance electrodes with a sintered structure according to the Swedish Pat. No. 360,952 or iron electrodes which are formed by precipitation of active iron in a supporting matrix of sintered nickel or iron fibers as has been described in the German Offenlegungsschrift No. 2,206,828.

The addition of lead sulfide of the present invention may be applied to all known types of iron electrodes as well as with the classic type of iron electrodes according to Edison's and Jungner's inventions, see, for instance, Falk and Salkind "Alkaline Storage Batteries".

The addition of lead sulfide to the iron electrode may take place by different methods, the choice of which mainly depends on the process used for the manufacture of the iron electrode. For example, particles of lead sulfide may be introduced into the iron electrode material during the electrode manufacture or, alternatively, lead may be added to the iron electrode material for later reaction with sulfide ions to form lead sulfide in situ. The use of a particular method of addition of the lead sulfide to the iron electrode is within the purview of the man skilled in the art. In both cases, the lead sulfide or the lead particles should be finely distributed in the electrode structure which can be obtained by using particles of lead sulfide or lead having particle sizes below 100 microns, preferably in the range of from about 0.1 to 10 microns, most preferably is between about 1 to 5 microns.

The invention is additionally illustrated in connection with the following Examples which are to be considered as illustrative of the present invention. It should be understood, however, that the invention is not limited to the specific details of the Examples.

EXAMPLE I

An iron anode was made by pressing a mixture of carbonyl iron with a particle size of about 2 microns, sodium chlorinde finely ground size of about 2 microns, sodium chloride finely ground to a size below 30 microns and lead sulfide powder with a particle size below 5 microns. The weight of the sodium chloride was 50% of the weight of the iron whereas the weight of lead sulfide was 1% of the iron powder weight.

The mixture was pressed at the pressure of 1.5 ton per $cm^2$ to form a circular plate with 2.4 mm thickness and 53 mm diameter. The plate was sintered at 790° Centigrade for 30 minutes in a nitrogen atmosphere and was then soaked in water for 4 hours. A second sintering took place at 790° C for 30 minutes in nitrogen. Thereafter the sintered plate was coined and current conductors were welded to the edge of the plate. The porosity of the plate was 65%. The plate demonstrated a stable capacity density of 0.45 Ah/g during a large number of cycles and exhibited a discharge curve of the ideal type as shown in FIG. 1.

EXAMPLE II

An iron anode was made in the same way as in Example I, except that the amount of lead sulfide was 0.5% of the iron powder weight. The capacity, discharge curve and life for this electrode was the same as in Example I.

EXAMPLE III

An iron anode was made in the same was as in Example I except that the amount of lead sulfide was 0.2% of the iron weight. The capacity of the electrode was in this case 0.40 Ah/g whereas the discharge curve (which was of the ideal type as shown in FIG. 1) was stable during a large number of cycles.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An electrochemical cell comprising a positive electrode, an electrolyte, and a negative electrode containing metallic iron and a small, effective amount of lead sulfide.

2. The electrochemical cell of claim 1 wherein the lead sulfide is present in an amount of at least about 0.05% by weight of the iron active material.

3. The electrochemical cell of claim 1 wherein the electrode contains from about 0.5 to 1% by weight of the lead sulfide.

4. The electrochemical cell of claim 1 wherein the electrode also contains iron sulfide.

5. The electrochemical cell of claim 1 wherein the lead sulfide is present in the form of particles having a particle size below 100 microns.

6. The electrochemical cell of claim 1 wherein the cell is an air-iron cell.

7. The electrochemical cell of claim 2 wherein the lead sulfide is present in an amount of at least about 0.1%.

8. The electrochemical cell of claim 5 wherein the lead sulfide particles have a particle size in the range of 0.1 to 10 microns.

9. The electrochemical cell of claim 8 wherein the lead sulfide particles have a particle size in the range of 1 to 5 microns.

* * * * *